(12) United States Patent
Jansma et al.

(10) Patent No.: US 10,882,133 B2
(45) Date of Patent: Jan. 5, 2021

(54) TIP-RETENTION DEVICE FOR USE WITH A WELDING SYSTEM

(71) Applicant: ILLINOIS TOOL WORKS INC., Glenview, IL (US)

(72) Inventors: Jeremy L. Jansma, Lowell, IN (US); Robert J. Centner, Frankfort, IL (US); Jeffrey G. Wells, Appleton, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 225 days.

(21) Appl. No.: 15/826,340

(22) Filed: Nov. 29, 2017

(65) Prior Publication Data

US 2018/0214973 A1 Aug. 2, 2018

Related U.S. Application Data

(60) Provisional application No. 62/452,735, filed on Jan. 31, 2017.

(51) Int. Cl.
| | | |
|---|---|---|
| *B23K 9/29* | (2006.01) | |
| *B23K 9/32* | (2006.01) | |
| *B23K 9/26* | (2006.01) | |
| *B23K 9/173* | (2006.01) | |

(52) U.S. Cl.
CPC ............. *B23K 9/291* (2013.01); *B23K 9/173* (2013.01); *B23K 9/26* (2013.01); *B23K 9/323* (2013.01)

(58) Field of Classification Search
CPC .......... B23K 9/173; B23K 9/26; B23K 9/291; B23K 9/323
USPC ..... 219/136, 137.31, 137.43, 137.44, 137.61
See application file for complete search history.

(56) References Cited

U.S. PATENT DOCUMENTS

| | | |
|---|---|---|
| 2,297,548 A | 9/1942 | Fox et al. |
| 3,083,290 A | 3/1963 | Kennedy |
| 3,121,784 A | 2/1964 | McGinty et al. |
| 3,210,523 A | 10/1965 | Cotter |
| 3,270,179 A | 8/1966 | Russell |
| 3,283,121 A | 11/1966 | Bernard et al. |
| 3,469,070 A | 9/1969 | Bernard et al. |
| 3,487,194 A | 12/1969 | Poulton et al. |
| 3,488,468 A | 1/1970 | Carbone |
| 3,514,570 A | 5/1970 | Bernard et al. |
| 3,529,126 A | 9/1970 | Reeh |
| 3,529,128 A | 9/1970 | Cruz, Jr. |
| 3,541,298 A | 11/1970 | Carkhuff |
| 3,576,423 A | 4/1971 | Bernard |
| 3,596,049 A | 7/1971 | Ogden |
| 3,597,576 A | 8/1971 | Bernard et al. |

(Continued)

FOREIGN PATENT DOCUMENTS

| | | |
|---|---|---|
| CA | 2242273 A1 | 5/2000 |
| CH | 509127 | 6/1971 |

(Continued)

OTHER PUBLICATIONS

Excerpt from Victor Equipment Company Brochure, pp. 24,32,34 (1951).

(Continued)

*Primary Examiner* — Vishal Pancholi
(74) *Attorney, Agent, or Firm* — McAndrews, Held & Malloy, Ltd.

(57) ABSTRACT

Apparatus, systems, and/or methods for providing welding systems or portions of welding systems that provide a tip-retention device that is configured to direct gas radially towards a contact tip.

20 Claims, 11 Drawing Sheets

(56) References Cited

U.S. PATENT DOCUMENTS

| | | |
|---|---|---|
| 3,629,547 A | 12/1971 | Kester et al. |
| 3,659,076 A | 4/1972 | Ogden, Sr. |
| 3,689,732 A | 9/1972 | Hill |
| 3,825,720 A | 7/1974 | Zillinger |
| 3,878,354 A | 4/1975 | Frantzreb, Sr. |
| 3,934,782 A | 1/1976 | Cushman et al. |
| 3,940,586 A | 2/1976 | Stearns et al. |
| 4,008,384 A | 2/1977 | Cecil |
| 4,049,943 A | 9/1977 | Pratt |
| 4,158,763 A | 6/1979 | Moerke |
| 4,280,043 A | 7/1981 | Feix |
| 4,297,561 A | 10/1981 | Townsend et al. |
| 4,403,136 A | 9/1983 | Colman |
| 4,529,863 A | 7/1985 | Lebel |
| 4,554,432 A | 11/1985 | Raloff |
| 4,563,569 A | 1/1986 | Shiramizu |
| 4,672,163 A | 6/1987 | Matsui |
| 4,675,493 A | 6/1987 | Gartland et al. |
| 4,731,518 A | 3/1988 | Parmelee et al. |
| 4,767,908 A | 8/1988 | Dallavalle |
| 4,945,208 A | 7/1990 | Lian |
| 4,954,688 A | 9/1990 | Winterfeldt |
| 4,978,831 A | 12/1990 | Lian |
| 4,994,707 A | 2/1991 | Stark |
| 5,013,885 A | 5/1991 | Carkhuff |
| 5,132,513 A | 7/1992 | Ingwersen et al. |
| 5,258,599 A | 11/1993 | Moerke |
| 5,260,546 A | 11/1993 | Ingwersen et al. |
| 5,338,917 A | 8/1994 | Stuart |
| 5,380,980 A | 1/1995 | Coiling |
| 5,440,100 A | 8/1995 | Stuart |
| 5,491,321 A | 2/1996 | Stuart |
| 5,635,090 A | 6/1997 | Lubieniecki |
| 5,669,556 A | 9/1997 | Yoshida |
| 5,726,420 A | 3/1998 | Lajoie |
| 5,760,373 A | 6/1998 | Colling |
| 5,772,102 A | 6/1998 | New |
| 6,075,227 A | 6/2000 | Lajoie |
| 6,078,023 A | 6/2000 | Jones |
| 6,163,008 A | 12/2000 | Roberts |
| 6,176,412 B1 | 1/2001 | Weinger et al. |
| 6,191,380 B1 | 2/2001 | Thomas |
| 6,225,599 B1 | 5/2001 | Altekruse |
| 6,271,497 B1 | 8/2001 | Zapletal |
| 6,307,179 B1 | 10/2001 | Walters |
| 6,525,297 B2 | 2/2003 | Doherty |
| 6,657,162 B1 | 12/2003 | Jung |
| 6,689,987 B2 | 2/2004 | Altekruse et al. |
| 6,744,013 B2 | 6/2004 | Jones |
| 6,774,013 B2 | 8/2004 | Dowben et al. |
| 6,847,009 B2 | 1/2005 | Stuart |
| 6,924,461 B2 | 8/2005 | Matiash |
| 7,105,775 B2 | 9/2006 | Giese |
| 7,176,412 B2 | 2/2007 | Viells |
| 7,244,909 B2 | 7/2007 | Kensrue et al. |
| 7,271,366 B2 | 9/2007 | Kensrue |
| 7,342,200 B2 | 3/2008 | Eberle |
| 7,381,923 B2 | 6/2008 | Gordon et al. |
| 7,576,300 B2 | 8/2009 | Giese |
| 7,905,741 B1 | 3/2011 | Wade et al. |
| 8,552,341 B2 | 10/2013 | Zamuner |
| 9,302,341 B2 | 4/2016 | Oh et al. |
| 9,308,599 B2 | 4/2016 | Sadowski et al. |
| 9,527,155 B2 | 12/2016 | Meess et al. |
| 9,539,663 B2 | 1/2017 | Grossauer et al. |
| 9,669,486 B2 | 6/2017 | Dingeldein |
| 9,950,386 B2 | 4/2018 | Cooper et al. |
| 10,052,708 B2 | 8/2018 | Redding et al. |
| 2002/0113047 A1 | 8/2002 | Doherty |
| 2002/0117484 A1 | 8/2002 | Jones et al. |
| 2003/0057196 A1 | 3/2003 | Jones |
| 2003/0209530 A1 | 11/2003 | Stuart |
| 2004/0026394 A1 | 2/2004 | Giese |
| 2004/0026395 A1 | 2/2004 | Giese |
| 2004/0079741 A1 | 4/2004 | Keegan |
| 2004/0079784 A1 | 4/2004 | Giese |
| 2005/0109738 A1 | 5/2005 | Hewett et al. |
| 2006/0226132 A1 | 10/2006 | Giese |
| 2006/0226133 A1 | 10/2006 | Giese et al. |
| 2006/0226134 A1 | 10/2006 | Giese et al. |
| 2006/0289413 A1 | 12/2006 | Eberle |
| 2007/0062922 A1 | 3/2007 | Zamuner |
| 2007/0108173 A1 | 5/2007 | Zamuner |
| 2007/0210049 A1 | 9/2007 | Dingeldein |
| 2010/0012637 A1 | 1/2010 | Jaegar |
| 2011/0006522 A1 | 1/2011 | Bichler et al. |
| 2012/0125903 A1 | 5/2012 | Izutani et al. |
| 2013/0112661 A1 | 5/2013 | Dambra |
| 2013/0126504 A1 | 5/2013 | Hassan |
| 2013/0126505 A1 | 5/2013 | Hassan |
| 2013/0126506 A1 | 5/2013 | Hassan |
| 2013/0134143 A1 | 5/2013 | Hassan |
| 2014/0131336 A1 | 5/2014 | Jacques |
| 2014/0251972 A1 | 9/2014 | Garvey et al. |
| 2014/0263250 A1 | 9/2014 | Meess et al. |
| 2014/0263251 A1 | 9/2014 | Enyedy |
| 2014/0263253 A1 | 9/2014 | Meess et al. |
| 2014/0263254 A1 | 9/2014 | Enyedy |
| 2014/0319103 A1 | 10/2014 | Stabb et al. |
| 2014/0374399 A1 | 12/2014 | Kachline |
| 2015/0129570 A1 | 5/2015 | Redding |
| 2015/0129571 A1 | 5/2015 | Hassan |
| 2015/0129572 A1 | 5/2015 | Hassan |
| 2015/0135796 A1 | 5/2015 | Hassan |
| 2015/0136747 A1 | 5/2015 | Hassan |
| 2015/0136748 A1 | 5/2015 | Hassan |
| 2015/0136749 A1 | 5/2015 | Hassan |
| 2015/0165542 A1 | 6/2015 | Hassan |
| 2015/0190879 A1 | 7/2015 | Kachline |
| 2016/0144446 A1 | 5/2016 | Centner et al. |
| 2017/0080510 A1 | 3/2017 | Centner et al. |
| 2017/0080511 A1 | 3/2017 | Jaeger et al. |

FOREIGN PATENT DOCUMENTS

| | | |
|---|---|---|
| DE | 202013102979 | 7/2013 |
| EP | 0231153 A2 | 5/1987 |
| EP | 0231153 A3 | 5/1987 |
| EP | 1388388 | 2/2004 |
| EP | 2457682 | 5/2012 |
| FR | 2291819 | 11/1974 |
| FR | 2291819 A1 | 6/1976 |
| JP | H05196022 U | 8/1976 |
| JP | 5290444 | 7/1977 |
| JP | S55156680 A | 12/1980 |
| JP | S57134279 A | 8/1982 |
| KR | 101412374 | 6/2014 |
| WO | 0073700 A1 | 12/2000 |
| WO | 2007030720 | 3/2007 |
| WO | 2008018979 | 4/2008 |

OTHER PUBLICATIONS

Excerpt from Victor Equipment Company Welding and Cutting Equipment Brochure, Catalog 20C 10-51 CW (1965).

International Search Report from PCT application No. PCT/US2016/050161, dated Nov. 17, 2016, 12 pgs.

Sugimoto et al., "English Translation of JP 55156680 A", U.S. Patent & Trademark Office (Sep. 25, 2006).

Extended European Search Report for European Patent Application No. 18153004.9, dated Jun. 22, 2018, 6 pages.

International Search Report from PCT Application No. PCT/US2018/028255 dated Jul. 5, 2018, 5 pages.

Extended European Search Report for European Application No. 18151151.0, dated Jul. 5, 2018, 6 pages.

Canadian Office Action for Application No. 2,996,229, dated Sep. 20, 2019, 3 pages.

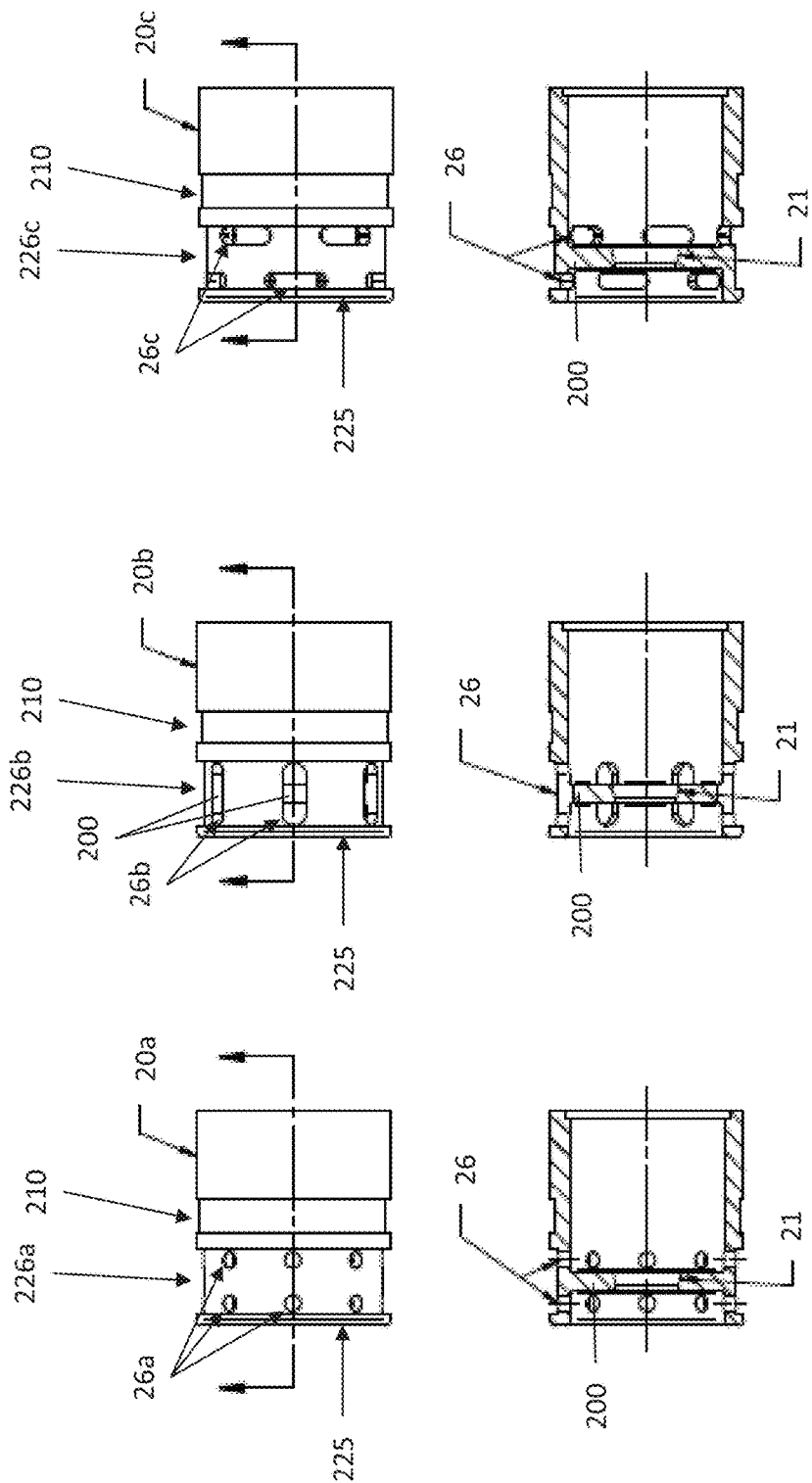

TIP-RETENTION DEVICE FOR USE WITH A WELDING SYSTEM

CROSS REFERENCE TO RELATED APPLICATIONS

The present application claims the benefit of U.S. Provisional Patent Application Ser. No. 62/452,735 filed Jan. 31, 2017, entitled "TIP-RETENTION DEVICE FOR USE WITH A WELDING SYSTEM." The entire contents of U.S. Provisional Patent Application Ser. No. 62/452,735 are expressly incorporated herein by reference.

BACKGROUND

Limitations and disadvantages of conventional and traditional approaches will become apparent to one of skill in the art, through comparison of such systems with the present disclosure as set forth in the remainder of the present application with reference to the drawings.

BRIEF SUMMARY

Apparatus, systems, and methods for providing a welding system or parts of a welding system are provided, substantially as illustrated by and/or described in connection with at least one of the figures, as set forth more completely in the claims.

BRIEF DESCRIPTION OF THE DRAWINGS

FIGS. 6A-6C show various side and cross-sectional side views of other example tip-retention devices according to the present disclosure.

DETAILED DESCRIPTION

Figure 1A:
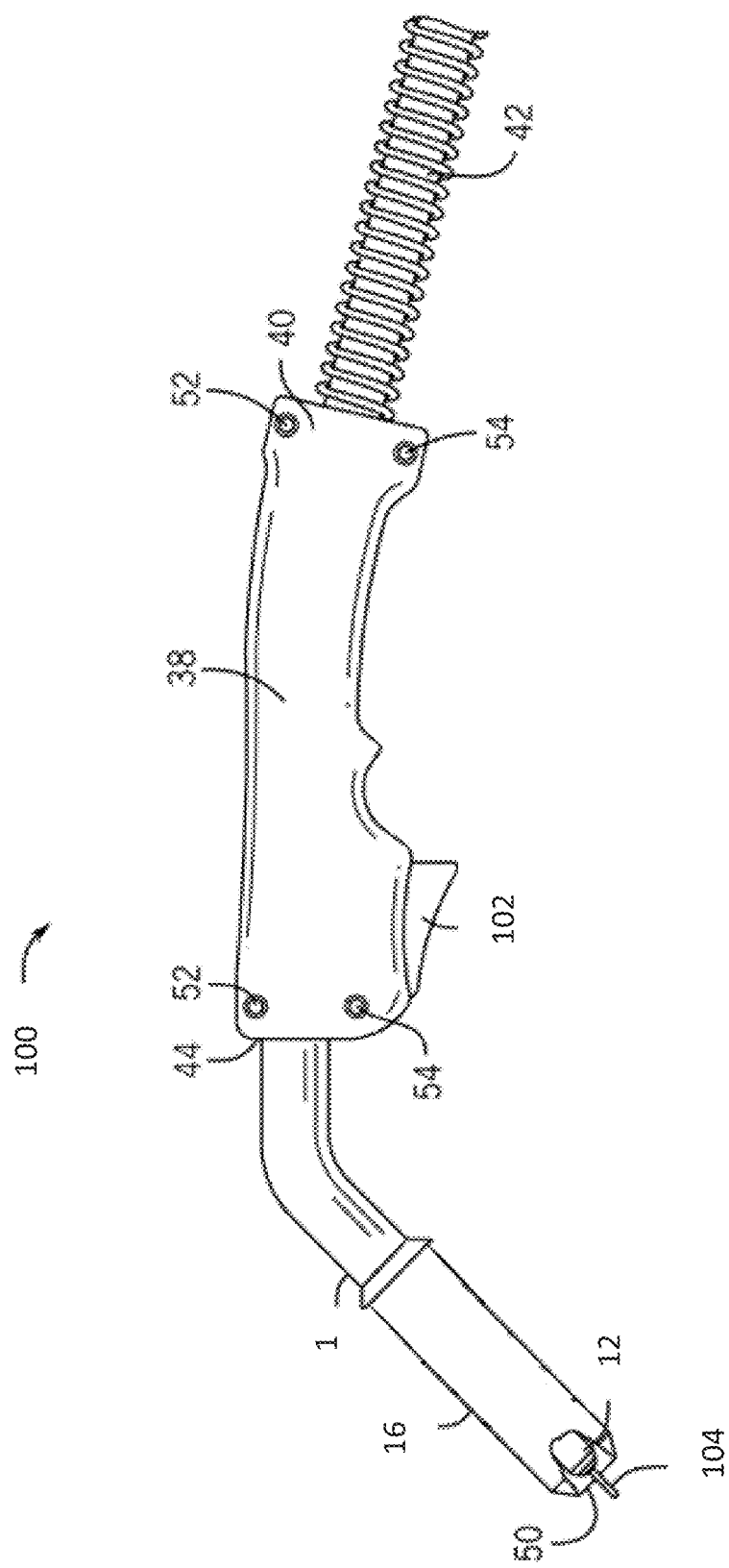
FIG. 1A shows an example welding torch according to the present disclosure.

Some examples of the present disclosure relate to a welding torch, comprising a nozzle including a tip-retention device, and a contact tip retained by the tip-retention device, wherein the tip-retention device comprises a gas channel configured to direct gas radially towards the contact tip with respect to an axis of the contact tip.

In some examples, the tip-retention device is configured to receive a gas diffuser and the contact tip, and wherein the gas diffuser includes a seat with a stepped profile that is configured to interface with a stepped profile of the contact tip. In some examples, the tip-retention device is configured to interface with a taper of the contact tip. In some examples, the gas channel of the tip-retention device is configured to direct the gas radially away from the contact tip before directing the gas towards the contact tip. In some examples, the tip-retention device comprises a tip-retention wall configured to direct the gas radially away from the contact tip. In some examples, the tip-retention device comprises an annular rim having a leading edge that is configured to direct the gas towards the contact tip. In some examples, the gas channel of the tip-retention device comprises a first slot on a first side of the tip-retention wall and a second slot on a second side of the tip-retention wall, and the leading edge is configured to protect the gas channel of the tip-retention device from welding spatter.

Some examples of the present disclosure relate to a nozzle for use with a welding torch, comprising a tip-retention device having a gas channel, and a contact tip retained by the tip-retention device, where the tip-retention device is configured to direct gas radially towards the contact tip with respect to an axis of the contact tip.

In some examples, the tip-retention device is configured to receive a gas diffuser and the contact tip, and the gas diffuser includes a seat with a stepped profile that is configured to interface with a stepped profile of the contact tip. In some examples, the tip-retention device is configured to interface with a taper of the contact tip. In some examples, the gas channel of the tip-retention device is configured to direct the gas radially away from the contact tip before directing the gas towards the contact tip. In some examples, the tip-retention device comprises a tip retention wall configured direct the gas radially away from the contact tip. In some examples, the tip-retention device comprises an annular rim having a leading edge that is configured to direct the gas towards the contact tip. In some examples, the gas channel of the tip-retention device comprises a first slot on a first side of the tip-retention wall and a second slot on a second side of the tip-retention wall, and the leading edge is configured to protect the gas channel of the tip-retention device from welding spatter.

Some examples of the present disclosure relate to a device for use with a welding torch, comprising a sidewall surrounding a hollow interior, a tip-retention wall attached to the sidewall, and a gas channel configured to allow gas to flow around the tip-retention wall, where the tip-retention wall is configured to retain a contact tip.

In some examples, the gas channel comprises a first slot on a first side of the tip-retention wall and a second slot on a second side of the tip-retention wall. In some examples, the tip-retention wall includes a locking taper configured to interface with a taper of the contact tip so as to retain the contact tip within the bore, and the tip-retention wall is configured to direct the gas radially away from the contact tip. In some examples, the device further includes an annular rim at the leading edge of the device, where the annular rim is configured to direct the gas towards the contact tip, and the annular rim is configured to protect the channel from welding spatter. In some examples, the tip-retention wall is configured to protect the channel from welding spatter. In some examples, the device is configured to engage a gas diffuser of the welding torch using at least one of a screw thread or a step in the sidewall, and the device is configured to direct gas from the gas diffuser towards the contact tip.

Some examples of the present disclosure relate to apparatus, systems, and methods that provide a welding system (e.g., a welding torch/gun consumable system) and/or parts of a welding system. In some examples, the welding system or parts of a welding system are structured to retain a contact tip and to direct gas flow towards a contact tip in a welding torch (e.g., a welding gun). In some examples, the welding torch may be structured to retain the contact tip with a forward-facing taper and to include a nozzle that is structured with one or more radial gas channels (e.g., slots, holes, etc.) that direct gas flow radially towards the contact tip.

The welding torch may include gas holes that are positioned radially (e.g., outwardly facing) or axially (e.g., forwardly facing). During a welding application, weld spatter may adhere to the inside of the nozzle of the welding gun, thereby reducing the amount of gas flowing out of the nozzle. Axial gas holes may become clogged with spatter and the positioning of the radial gas holes may make cleaning difficult if there is not enough clearance between the gas holes and the nozzle wall.

Some examples of the welding system according to the present disclosure provide a welding torch (e.g., a welding gun) that has gas channels that are located on the inner wall of the nozzle body to direct the gas inwardly towards the contact tip. The gas channels may be protected from weld spatter since they are radially positioned. A leading edge of a tip-retention device of the nozzle is positioned to further protect the gas channels from weld spatter. If weld spatter does build up on the tip-retention device, the tip-retention device is readily accessible, and the weld spatter may be removed with a nozzle reamer or welpers, for example.

Some examples of the welding system according to the present disclosure benefit from this gas channel configuration by directing the gas towards the contact tip to assist in cooling the contact tip. This may extend the useful life of the contact tip. While some examples provide configurations that direct the gas around the contact tip towards the weld puddle, other examples of the welding system or the weld torch provide for directing the gas (e.g., shielding gas) towards the contact tip before exiting the nozzle.

Some examples of the welding system according to the present disclosure provide for a welding torch or gun that includes or receives a contact tip that utilizes a taper (e.g., a forward-facing taper) to engage with a tip-retention device for concentricity and conductivity. In some examples, a stepped profile is added to the back end of the contact tip that engages with a mating stepped profile seat (and/or pocket) in a gas diffuser to provide additional concentricity support and positioning with respect to a liner lock.

FIG. 1A shows an example welding gun/torch 100. The torch 100 includes a neck assembly 1 extending out of a second end 44 of a handle 38. As such, the neck assembly 1 is coupled between the handle 38 and a welding nozzle assembly 16. A trigger 102 is disposed on the handle 38. The torch 100 may be configured such that, when the trigger 102 is pressed or actuated, welding wire (e.g., electrode 104) travels through the cable 42, the handle 38, the neck assembly 1, and the welding nozzle assembly 16, so that the welding wire extends out of an end 50 (i.e., torch tip) of the welding nozzle assembly 16. Further, as illustrated in FIG. 1A, the handle 38 may be secured to the neck assembly 1 via fasteners 52 and 54. At a first end 40, fasteners 52 and 54 may secure the handle 38 to a welding cable 42 that connects to a welding power supply (not shown). The welding cable 42 may supply welding consumables where welding consumables (e.g., the electrode 104, the shielding gas, and so forth) to the welding torch 100 through the welding cable 42. The welding nozzle assembly 16 is illustrated with a portion of the welding nozzle assembly 16 removed to show an electrode 104 extending out of a contact tip 12 that is disposed within the welding nozzle assembly 16. It will be understood that the welding torch 100 is presented only as an example; the present disclosure may apply to a variety of different welding torch designs.

Figure 1B:
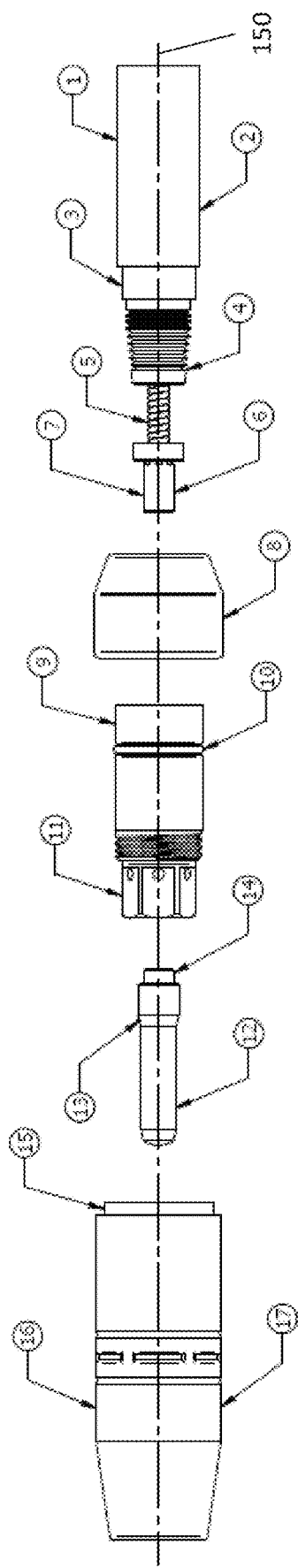
FIG. 1B shows an exploded view of portions of a nozzle assembly and/or neck assembly without a tip-retention device according to the present disclosure.

FIG. 1B shows an exploded view of an example of portions of a welding torch (e.g., a welding gun) according to the present disclosure. Referring to FIG. 1B, a nozzle assembly 16 includes, for example, a nozzle body 17 and a nozzle insulator 15 (e.g., a nozzle electrical insulator). The nozzle assembly 16 is configured to retain a contact tip 12 (e.g., an electrically conductive contact tip). The contact tip 12 may include, for example, a forward-facing locking taper 13 and a stepped profile 14. The stepped profile 14 may be rear-facing, for example. A gas diffuser 9, which may be electrically conductive, is configured to receive the contact tip 12. The gas diffuser 9 is configured to receive an O-ring 10 and includes wrench flats 11 that are used to tighten the gas diffuser 9 to a neck assembly 1 (e.g., a welding torch neck assembly) with an insulator cap 8 (e.g., electrical insulator cap) therebetween. The neck assembly 1 includes neck armor 2, neck insulation 3 (e.g., electrical neck insulation), and a neck inner portion 4. The neck assembly 1 is configured to house a liner coil 5. A liner assembly 7 including a liner lock 6 is attached to the liner coil 5. The stepped profile 14 is configured to align with the liner lock 6.

FIGS. 2A-2F show various perspective, side, and cross-sectional views of a tip-retention device 20. As shown, the tip-retention device 20 is approximately cylindrical, though in some examples the tip-retention device may be shaped differently to accommodate the shape of the nozzle assembly 16. The tip-retention device 20 includes an approximately cylindrical sidewall 204. The sidewall 204 surrounds a generally hollow interior. A tip-retention wall 200 extends from the sidewall 204 into the interior of the tip-retention device 20, proximate a leading edge 25 of the tip-retention device 20. The tip-retention wall 200 includes a bore 202 configured to fit the contact tip 12.

The tip-retention wall 200 further includes a locking taper 21 on the portion of the tip-retention wall 200 immediately surrounding the bore 202. The locking taper 21 is configured to engage a matching locking taper 13 (e.g., a forward-facing locking taper) of the contact tip 12. More particularly, the locking taper 21 of the tip-retention wall 200 may be configured to abut and/or engage the locking taper 13 of the contact tip 12, so as to retain the contact tip 12 within the bore 202 of the tip-retention device 20. Because of the locking taper 21, the bore 202 has a smaller circumference (and/or radius, diameter, size, etc.) on one side of the tip-retention wall 200 than on the other. More particularly, the bore 202 has a smaller circumference (and/or radius, diameter, size, etc.) on the side of the tip-retention wall 200 closest to the leading edge 25 of the tip-retention device 20. The bore 202 has a larger circumference (and/or radius, diameter, size, etc.) on the side of the tip-retention wall 200 closer to dimple 210.

Figure 2B:
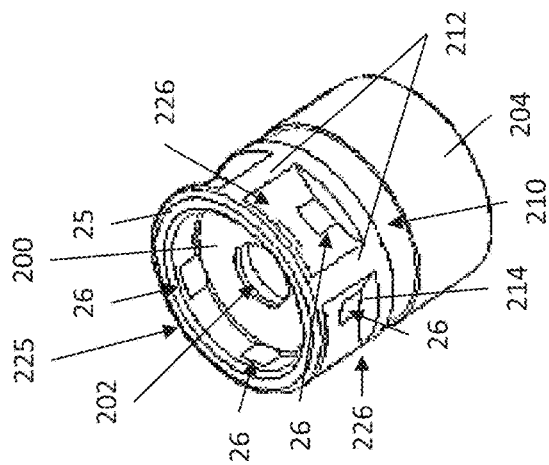
FIGS. 2A-2F show various views of an example tip-retention device according to the present disclosure.
Figure 2C:
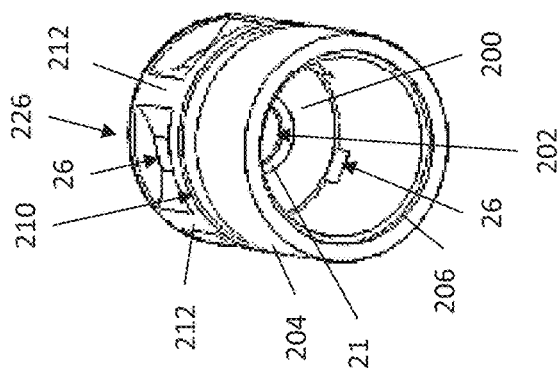
Figure 2A:
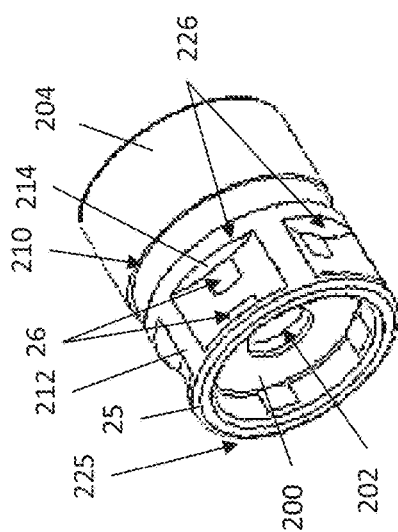
Figure 2D:
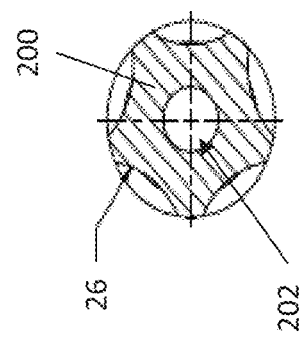
Figure 2E:
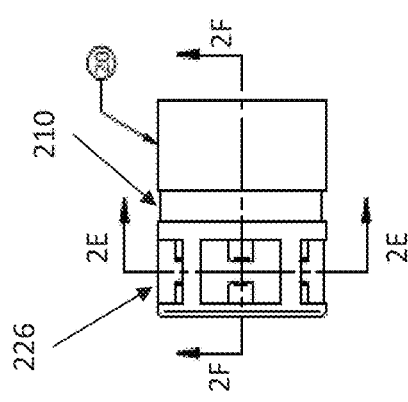
Figure 2F:
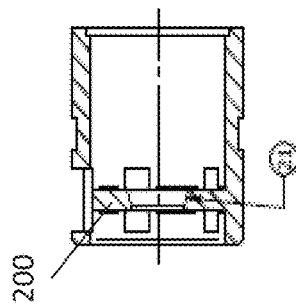
Figure 2H:
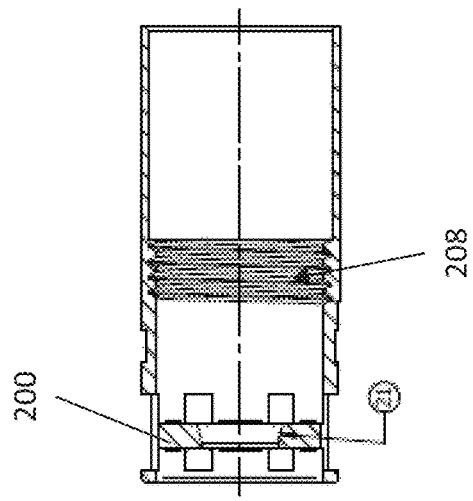
FIGS. 2G-2I show various views of another example tip-retention device according to the present disclosure.
Figure 2I:
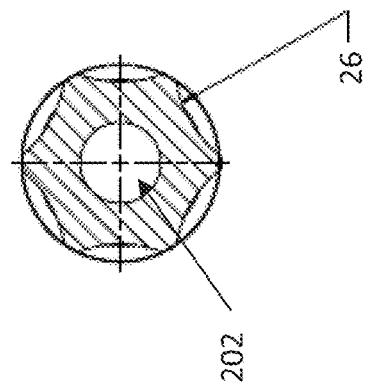
Figure 2G:
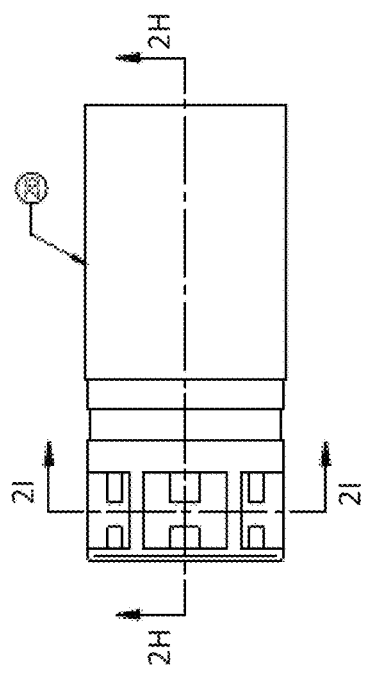

At the rear of the tip-retention device 20, the sidewall 204 surrounding the hollow interior includes a step 206 configured to engage with the gas diffuser 9. FIGS. 2G-2I illustrate another example of the tip-retention device 20 with screw threads 208 configured to engage the gas diffuser 9, rather the step 206. The sidewall 204 further includes an annular dimple 210 approximately midway along its length. Forward of the annular dimple 210 are curved cutaways in the sidewall 204 that define channels 226 for gas (e.g. shielding gas) to flow.

The tip-retention device 20 shown in FIGS. 2A-2I includes six channels 226, though the number, size, and/or shape of the channels 226 may vary depending on a number of factors, including, for example, a size and/or shape of the nozzle assembly 16 being used. Each channel 226 is bordered by a flat 212 on either side of the channel 226. Each channel 226 is bordered at the front by an annular rim 225 that comprises a leading edge 25 of the tip-retention device 20. At the rear of each channel is a ledge 214 of the sidewall 204 created by the curved cutting away of the sidewall 204.

Slots 26 are positioned in the sidewall 204 within the channel 226, on either side of the tip-retention wall 200. The slots 26 (or holes) are configured to guide shielding gas, for example, from the gas diffuser 9 to a weld puddle, for example. While in the example of FIG. 2A, each channel 226 includes two slots 26 (one forward of the tip-retention wall 200 and one rear of the tip-retention wall 200), in other examples each channel 226 may include more or less than two slots 26. The number and size of the slots 26 may vary depending on a number of factors including, for example, a size and/or shape of a nozzle assembly 16 being used. For instance, in some examples, each channel 226 may include four slots 26, with two forward of the tip-retention wall 200 and two rear of the tip-retention wall 200, or six slots, with three forward of the tip-retention wall 200 and three rear of the tip-retention wall 200. In some examples, each channel 226 may include more slots 26 on one side of the tip-retention wall 200 than the other. For example, each channel may include three slots 26, with two forward of the tip-retention wall 200 and one rear of the tip-retention wall 200. The slots 26 help to give the curved channels 226 their H shape.

Figure 4A:
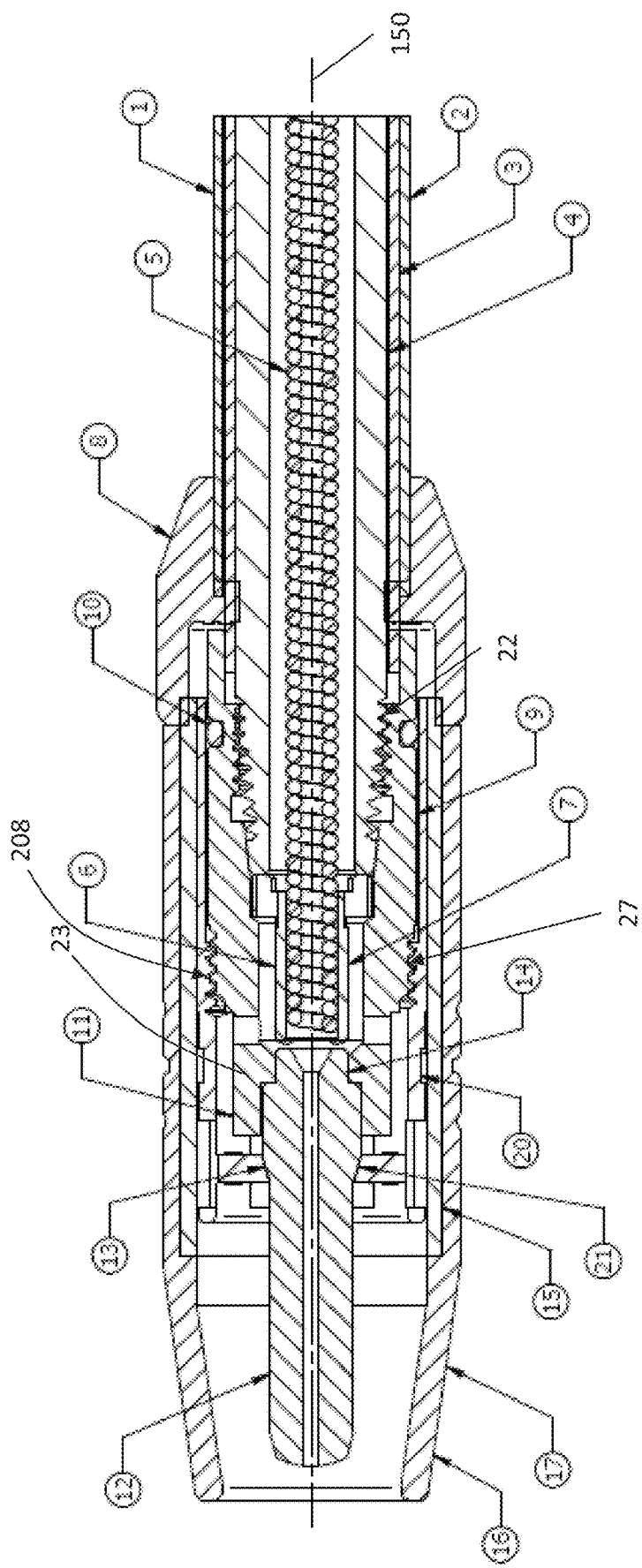
FIGS. 4A and 4B show cross-sectional side and partial cross-sectional perspective views, respectively, of an assembled example nozzle assembly and/or neck assembly having a tip-retention device according to the present disclosure.
Figure 4B:
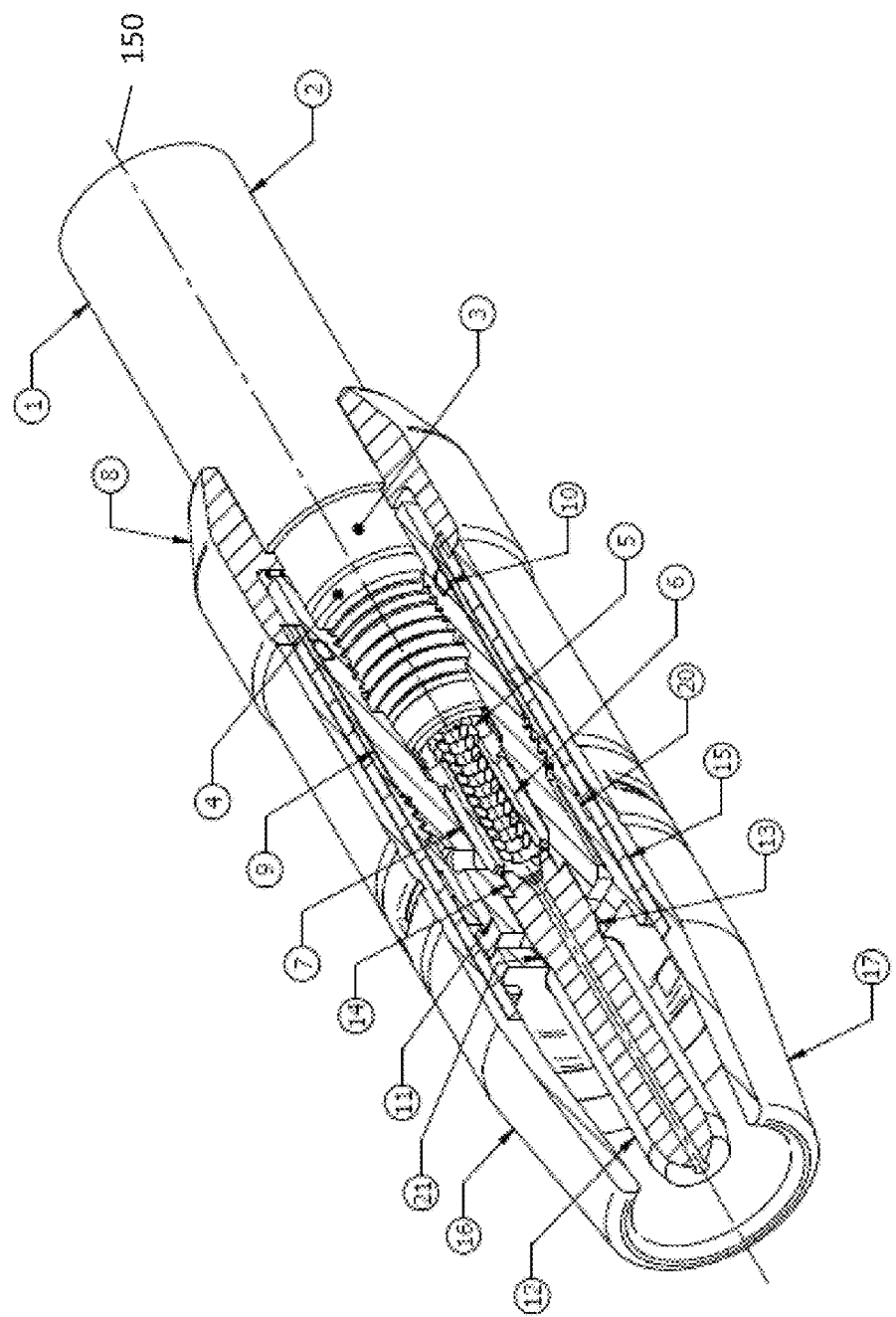

FIGS. 4A and 4B show a cross-section side view and a partial cross-sectional perspective view, respectively, of portions of the nozzle assembly 16 and/or neck assembly 1 with the tip-retention device 20. Referring to FIGS. 4A and 4B, the wrench flats 11 of the gas diffuser 9 are used to attach the gas diffuser 9 to the neck assembly 1 via internal threads 22, for example, of the gas diffuser 9. The gas diffuser 9 may be attached to the nozzle assembly 16 via external threads 27, for example, of the gas diffuser 9. In some examples, the gas diffuser 9 is attached to the tip-retention device 20 of the nozzle assembly 16 via external threads 27. In some examples, the tip-retention device 20 may be, for example, a nozzle insert and/or addition that is crimped into and/or outside of the nozzle body 17. In other examples, the tip-retention device 20 may be an integral part of the nozzle body 17, the nozzle insulator 15, and/or the nozzle assembly 16.

In operation, the curved cutaway channels 226 of the tip-retention device 20 may provide space for gas (e.g. shielding gas) to flow through the nozzle assembly 16 from the gas diffuser 9. More particularly, gas may enter the hollow interior of the tip-retention device 20 from the gas diffuser 9. The gas may encounter the tip-retention wall 200 and be directed (and/or deflected, guided, etc.) radially outward, through the slot 26. The gas may then be directed radially inward through the slot 26 on the other side of the tip-retention wall 200 by the nozzle insulator 15 and/or the rim 225 comprising the leading edge 25 of the tip-retention device 20. This configuration may direct the gas towards the contact tip 12 as the gas passes from the gas diffuser 9 out of the nozzle assembly 16 to a weld puddle, for example. When directed towards the contact tip 12, the gas flow 500 may cool the contact tip 12, thereby extending the life of contact tip 12.

The tip-retention device 20 may be configured to provide clearance for gas flow by providing channels through a side wall to direct gas inwardly towards the contact tip 12. The inward gas flow is directed at the contact tip 12 which provides a cooling effect on the contact tip. Inwardly facing gas channels (e.g., radial channels) resist spatter collection in comparison to forward-facing gas holes (e.g., axial channels). Spatter may be removed from the front face of the tip-retention device 20 using a nozzle reamer or welpers. In some examples, the tip-retention device 20 includes a taper 21 that is configured to lock the contact tip 12. In some examples, the contact tip 12 has locking taper 13 that is configured to engage with the taper 21 in the tip-retention device 20 to maintain concentricity and conductivity. The contact tip 12 also includes a stepped profile 14 to engage with the gas diffuser 9 and to assist in maintaining concentricity and alignment with liner lock 6.

Figure 3:
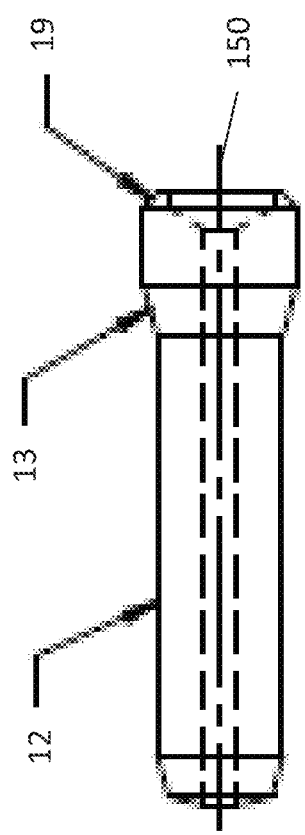
FIG. 3 shows a cross-sectional view of an example of a contact tip according to the present disclosure.

In some examples, the gas diffuser 9 includes a seat 23 that is configured to receive the contact tip 12. The stepped profile 14 (e.g., a rear-facing stepped profile) of the contact tip 12 interfaces (e.g., engages) with a corresponding stepped profile of the seat 23 of the gas diffuser 9. While the rear end of the contact tip 12 is disposed against the seat 23 of the gas diffuser 9, the tip-retention device 20 of the nozzle assembly 16 keeps the contact tip 12 in place. The seat 23 (or pocket) provides additional concentricity support and/or positioning to the contact tip 12 with respect to the liner lock 6. In some examples, a locking taper 13 (e.g., a forward-facing locking taper) of the contact tip 12 engages with a corresponding locking taper 21 of the tip-retention device 20 of the nozzle assembly 16. In some examples, the locking taper 13 is disposed closer to a rear end of the contact tip 12 than a front end of the contact tip 12. The contact tip 12 is locked in place between the locking taper 21 of the tip-retention device 20 and the seat 23 of the gas diffuser 9. In some examples, the contact tip 12 does not need its own threads to be locked in place. An example of a contact tip 12 with taper 13 and stepped profile 14 according to the present disclosure is shown in FIG. 3.

Figure 5A:
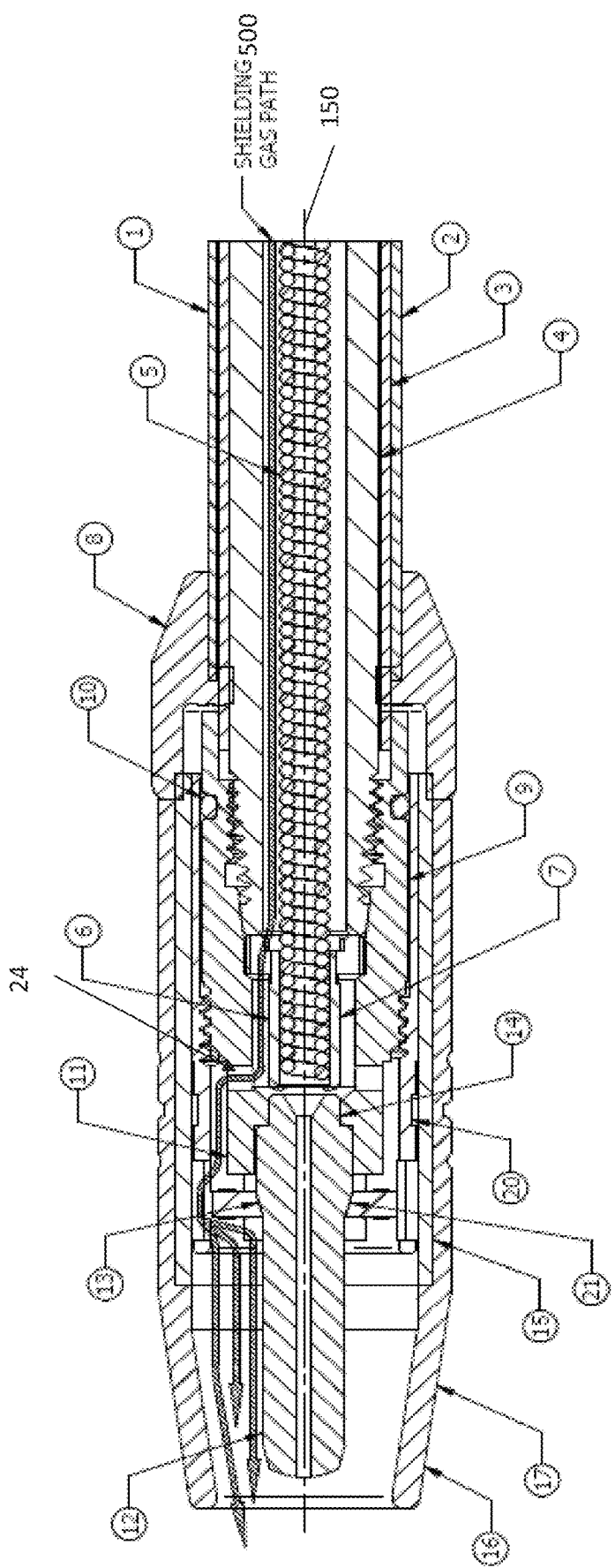
FIGS. 5A and 5B show exemplary gas flow through a cross-sectional side view and cross-sectional perspective view, respectively, of an assembled example nozzle assembly and/or neck assembly having a tip-retention device according to the present disclosure.
Figure 5B:
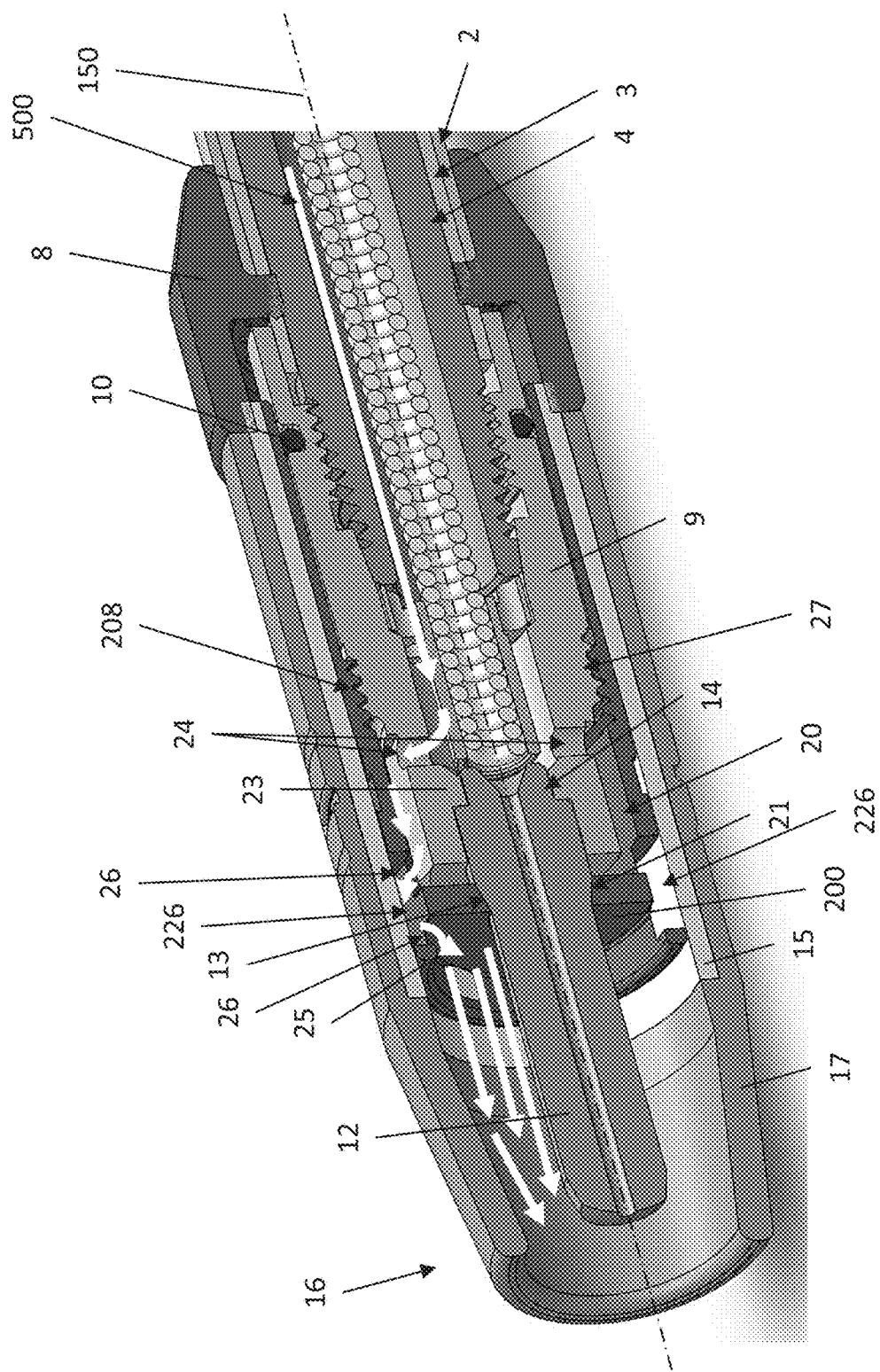

FIGS. 5A and 5B show an exemplary gas flow path 500 through a cross-sectional view of an assembled example nozzle assembly 16 and/or neck assembly 1 having a tip-retention device 20 according to the present disclosure. Referring to FIGS. 5A and 5B, the gas (e.g., shielding gas) flow path 500 passes through the neck assembly 1 to the gas diffuser 9. The gas flow path 500 passes through orifices 24 of the gas diffuser 9 into the nozzle assembly 16. In some examples, the gas flow path 500 through the orifices 24 is radially away from the axis 150 150 of the contact tip 12. The gas flow path 500 is then guided by the tip-retention device 20 along a direction substantially parallel with the axis 150 of the contact tip 12. Subsequently, the tip-retention wall 200 of the tip-retention device 20 guides the gas flow away (e.g., radially) from contact tip 12. More particularly, the gas flow path 500 is guided away from the contact tip 12 through a slot 26. A leading edge 25 of the tip-retention device 20 then guides the gas flow towards the contact tip 12 (e.g., in a substantially radial direction towards the contact tip 12) before exiting the nozzle assembly 16. More particularly, the leading edge 25 of the annular rim 225 may guide the gas flow path 500 radially towards the contact tip 12 through the slot 26. In some examples, the leading edge 25 is part of structure that forms the slot 26. The leading edge 25 and/or tip-retention wall 200 may help to protect the channel 226 and/or slots 26 from weld splatter. The plane containing the holes, slots, and/or leading edge may be substantially perpendicular to an axis 150 of the contact tip 12 or may be slightly angled to angle the gas flow towards the contact tip 12.

FIGS. 6A-C show various views of three other examples of the tip-retention device 20a, 20b, 20c according to the present disclosure. The three other examples of the tip-retention device 20a, 20b, 20c show different configurations of the gas channels 226a, 226b, 226c, using holes and/or slots 26a, 26b, 26c positioned radially around the tip-retention devices. Notably, rather than a plurality of separate gas channels 226, such as in the tip-retention device 20, each of the tip-retention devices 20a, 20b, 20c include a single gas channel 226a, 226b, 226c. Each gas channel 226a, 226b, 226c extends radially around the tip-retention device 20a, 20b, 20c between the dimple 210 and the rim 225. Each gas channel 226a, 226b, 226c includes a plurality of slots 26a, 26b, 26c.

In the tip-retention device 20a illustrated in FIG. 6A, the slots 26a are approximately circular. The slots 26a are spaced radially around the tip-retention device 20a, within the channel 226a. The slots 26a are paired and on opposite sides of the tip-retention wall 200, such that for each slot 26a on one side of the wall 200, there is a corresponding slot 26a on the other side of the wall 200. The paired slots 26a are approximately axially aligned.

In the tip-retention device 20b, illustrated in FIG. 6B, the slots 26b are approximately oval (and/or elliptical). The slots 26b are spaced radially around the tip-retention device 20b, within the channel 226b. Each slot 26b spans across the tip-retention wall 200, such that gas may pass through the slot 26b moving radially outwards on one side of the tip-retention wall 200, travel past the wall, then pass back through the slot 26b moving radially inwards on the other side of the tip-retention wall 200. In some examples, each slot 26b may be considered to comprise two axially aligned holes, with one hole on each side of the tip-retention wall 200.

In the tip-retention device 20c, illustrated in FIG. 6C, the slots 26c are approximately oval (and/or elliptical). The slots 26c are spaced radially around the tip-retention device 20c, within the channel 226c. Some of the slots 26c are on one side of the tip-retention wall 200, while other slots 26c are on the other side. The slots 26c are axially offset from one another, rather than axially aligned.

Some examples of the welding system according to the present disclosure provide gas channels that may be configured as a series of radially positioned holes or slots that face inwardly or that cause gas flow to be directed inwardly towards the contact tip.

Some examples of the welding system according to the present disclosure provide contact tips that are threaded or threadless. If threadless, no tool is necessary to insert the contact tip into the nozzle/gas diffuser assembly, for example. In some examples, the contact tip may be secured with the use of a tool.

Some examples of the welding system may be used with a contact tip that provides a consumable electrode, or that the contact tip may be replaced with an electrode for welding torches that do not provide the consumable.

Some examples of the welding system find application in various types of plasma cutting and welding application. In some examples, the welding system is applicable for use in gas metal arc welding (GMAW) applications or metal inert gas (MIG) welding applications.

While the present apparatus, systems, and/or methods have been described with reference to certain implementations, it will be understood by those skilled in the art that various changes may be made and equivalents may be substituted without departing from the scope of the present apparatus, systems, and/or methods. In addition, many modifications may be made to adapt a particular situation or material to the teachings of the present disclosure without departing from its scope. Therefore, it is intended that the present apparatus, systems, and/or methods not be limited to the particular implementations disclosed, but that the present apparatus, systems, and/or methods will include all implementations falling within the scope of the appended claims.

What is claimed is:

1. A welding torch, comprising:
   a nozzle including a tip-retention device; and
   a contact tip retained by the tip-retention device, wherein the tip-retention device comprises a gas channel in a sidewall of the tip-retention device, the tip-retention device configured to direct gas radially towards the contact tip, with respect to an axis of the contact tip, via the gas channel.

2. The welding torch according to claim 1, wherein the tip-retention device is configured to receive a gas diffuser and the contact tip, and wherein the gas diffuser includes a seat with a stepped profile that is configured to interface with a stepped profile of the contact tip.

3. The welding torch according to claim 1, wherein the tip-retention device includes a locking taper configured to interface with a taper of the contact tip.

4. The welding torch according to claim 1, wherein the gas channel of the tip-retention device is configured to direct the gas radially away from the contact tip before directing the gas towards the contact tip.

5. The welding torch according to claim 4, wherein the tip-retention device comprises a tip-retention wall configured to direct the gas radially away from the contact tip.

6. The welding torch according to claim 5, wherein the tip-retention device comprises an annular rim forward of the tip-retention wall, the annular rim having a leading edge that is configured to direct the gas towards the contact tip.

7. The welding torch according to claim 6, wherein the gas channel of the tip-retention device comprises a first slot on a first side of the tip-retention wall and a second slot on a second side of the tip-retention wall, the second side of the tip-retention wall being closer to the annular rim than the first side, wherein the leading edge of the annular rim is configured to protect the gas channel of the tip-retention device from welding spatter.

8. A nozzle for use with a welding torch, comprising:
   a tip-retention device having a sidewall and a gas channel in the sidewall; and
   a contact tip retained by the tip-retention device, wherein the tip-retention device is configured to direct gas radially towards the contact tip, with respect to an axis of the contact tip, via the gas channel.

9. The nozzle according to claim 8, wherein the tip-retention device is configured to receive a gas diffuser and the contact tip, and wherein the gas diffuser includes a seat with a stepped profile that is configured to interface with a stepped profile of the contact tip.

10. The nozzle according to claim 9, wherein the tip-retention device includes a locking taper is configured to interface with a taper of the contact tip.

11. The nozzle according to claim 8, wherein the gas channel of the tip-retention device is configured to direct the gas radially away from the contact tip before directing the gas towards the contact tip.

12. The nozzle according to claim 11, wherein the tip-retention device comprises a tip retention wall configured direct the gas radially away from the contact tip.

13. The nozzle according to claim 12, wherein the tip-retention device comprises an annular rim forward of the tip-retention wall, the annular rim having a leading edge that is configured to direct the gas towards the contact tip.

14. The nozzle according to claim 13, wherein the gas channel of the tip-retention device comprises a first slot on a first side of the tip-retention wall and a second slot on a second side of the tip-retention wall, the second side of the tip-retention wall being closer to the annular rim than the first side, wherein the leading edge is configured to protect the gas channel of the tip-retention device from welding spatter.

15. A contact tip retention device for use with a welding torch, comprising:
   a sidewall encircling a hollow interior;
   a tip-retention wall attached to the sidewall, wherein the tip-retention wall is configured to retain a contact tip; and
   a gas channel defined by at least one slot in the sidewall that extends radially with respect to an axis of the contact tip, the gas channel configured to allow gas to flow radially around the tip-retention wall with respect to the axis of the contact tip.

16. The device according to claim 15, wherein the gas channel comprises a first slot on a first side of the tip-retention wall and a second slot on a second side of the tip-retention wall.

17. The device according to claim 15, wherein the tip-retention wall includes a locking taper configured to interface with a taper of the contact tip so as to retain the contact tip within the bore, and wherein the tip-retention wall is configured to direct the gas radially away from the contact tip.

18. The device according to claim 16, wherein the device further includes an annular rim at the leading edge of the device, wherein the annular rim is configured to direct the gas towards the contact tip, and wherein the annular rim is configured to protect the channel from welding spatter.

19. The device according to claim 15, wherein the tip-retention wall is configured to protect the channel from welding spatter.

20. The device according to claim 15, wherein the device is configured to engage a gas diffuser of the welding torch using at least one of a screw thread or a step in the sidewall, wherein the device is configured to direct gas from the gas diffuser towards the contact tip.

* * * * *